US009552613B2

United States Patent
Chakrabarti et al.

(10) Patent No.: US 9,552,613 B2
(45) Date of Patent: Jan. 24, 2017

(54) LABEL INFERENCE IN A SOCIAL NETWORK

(71) Applicant: Facebook, Inc., Menlo Park, CA (US)

(72) Inventors: Deepayan Chakrabarti, Berkeley, CA (US); Sofus Attila Macskassy, Palo Alto, CA (US); Stanislav Funiak, Lawrence, KS (US); Jonathan Chang, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 344 days.

(21) Appl. No.: 14/272,176

(22) Filed: May 7, 2014

(65) Prior Publication Data

US 2015/0213370 A1     Jul. 30, 2015

Related U.S. Application Data

(60) Provisional application No. 61/932,108, filed on Jan. 27, 2014.

(51) Int. Cl.
| | |
|---|---|
| *G06Q 50/00* | (2012.01) |
| *G06N 7/00* | (2006.01) |
| *G06F 17/30* | (2006.01) |
| *G06N 7/02* | (2006.01) |

(52) U.S. Cl.
CPC ......... *G06Q 50/01* (2013.01); *G06F 17/30867* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 8,880,562 B2* | 11/2014 | Bhasin | ............. | G06F 17/30702 707/802 |
| 2008/0294506 A1* | 11/2008 | Dotan | ............. | G06Q 10/06398 705/319 |
| 2012/0110071 A1* | 5/2012 | Zhou | ..................... | G06Q 10/10 709/204 |
| 2014/0337356 A1* | 11/2014 | Barbieri | ................ | G06Q 50/01 707/748 |
| 2015/0142721 A1* | 5/2015 | Chakrabarti | ............. | G06N 7/00 706/52 |

OTHER PUBLICATIONS

Barbieri et al, Cascade-based Community Detection, 2012.*

(Continued)

*Primary Examiner* — Stanley K Hill
*Assistant Examiner* — Mikayla Chubb
(74) *Attorney, Agent, or Firm* — Perkins Coie LLP

(57) ABSTRACT

At least one embodiment of this disclosure includes a method of inferring attribute labels for a user in a social networking system based on the user's social connections and user-specified attribute labels in the social networking system. The method can include: establishing variational equations based on attribute labels of nodes in an ego network in a social graph of a social networking system; determining likelihood scores for at least a portion of the attribute labels of neighboring nodes from a focal user node in the ego network based on user-specified attribute labels from the social networking system; and calculating probability distributions of possible attribute labels for the focal user node of the ego network based on the variational equations and the likelihood scores.

20 Claims, 10 Drawing Sheets

(56) References Cited

OTHER PUBLICATIONS

Crandall et al, Feedback Effects between Similarity and Social Influence in Online Communities, 2013.*
Gallagher et al, Leveraging Network Structure to Infer Missing Values in Relational Data, 2007.*
Gong et al, Jointly Predicting Links and Inferring Attributes using a Social-Attribute Network, 2012.*
Guy et al, Do You Know? Recommending People to Invite into Your Social Network, 2009.*
Mislove et al, You Are Who You Know: Inferring User Profiles in Online Social Networks, 2010.*
Tang et al, Social Influence Analysis in Large-scale Networks, 2009.*
The Apache Giraph Project [online]. [Retrieved on Jun. 30, 2015] Retrieved from the Internet:<http://giraph.apache.org/intro.html>, 2 pages.
Press, W.H. et al., "Numerical Recipes 3rd Edition: The Art of Scientific Computing," Cambridge University Press, 2007, pp. 1-1235.
Saul, L. et al., "Mean Field Theory for Sigmoid Belief Networks," Journal of Artificial Intelligence Research 4 (Mar. 1996) pp. 61-76.
Zhu, X. et al., "Learning From Labeled and Unlabeled Data with Label Propagation," School of Computer Science, Carnegie Mellon University, Jun. 2002, pp. 1-17.
Zhu, X. et al., "Semi-Supervised Learning Using Gaussian Fields and Harmonic Functions," Proceedings of the Twentieth International Conference on Machine Learning (ICML-2003), Washington D.C., 2003, 8 pages.

\* cited by examiner

LABEL INFERENCE IN A SOCIAL
NETWORK

CROSS-REFERENCE TO RELATED
APPLICATION(S)

This application claims the benefit of U.S. Provisional Patent Application No. 61/932,108, entitled "JOINT INFERENCE OF MULTIPLE LABEL TYPES IN LARGE NETWORKS," which was filed on Jan. 27, 2014, which is incorporated by reference herein in its entirety.

RELATED FIELD

At least one embodiment of this disclosure relates generally to a social networking system, and, in particular, to inferring an attribute label for a user node in a social graph of a social networking system.

BACKGROUND

A social networking system provides online services that enable account holders to interact with each other, e.g., by sharing information, comments, photos, videos, etc. A social networking system account holder ("user") may be an individual or any other entity, e.g., a business or other non-person entity. Various relationships can be tracked within a social networking system, including connections amongst social network nodes (e.g., users, content postings, locations, group pages, event pages, comments page, etc.), including between users, between a user and a social networking object, and between a social networking object and another social networking object. A social networking object may be a user, a nonperson entity, a content item, a group, a social networking system page, a location, an application, a subject, a concept or other representations in the social networking system, e.g., a movie, a band, or a book.

Social networking system information (e.g., user profiles, social networking object profiles, and any interactions amongst users and social networking objects) that is tracked and maintained by a social networking system may be stored as a social graph, which includes multiple nodes that are interconnected by multiple edges. A social graph node may represent a social networking system object that can act on and/or be acted upon by another node, including the act of making an intentional "social connection." Amongst user nodes, this is commonly referred to as a user "friending" another user (e.g., adding the other user as a "friend." Each of these interactions can be stored as an edge of the social graph. The social graph can thus be stored as a database of edges and nodes, including profile data and metadata about these edges and nodes.

Services provided by the social networking system may sometimes depend on the profile data about these edges and nodes. For example, a friend recommendation to a user may require information about existing edges connected to the user and/or the user's location. However, information regarding the nodes is at times incomplete. As a result, services provided by social networking systems may be limited by the social networking systems' inability to accurately infer from existing data of the social graph additional attribute labels for the nodes and the edges.

Figure 1:
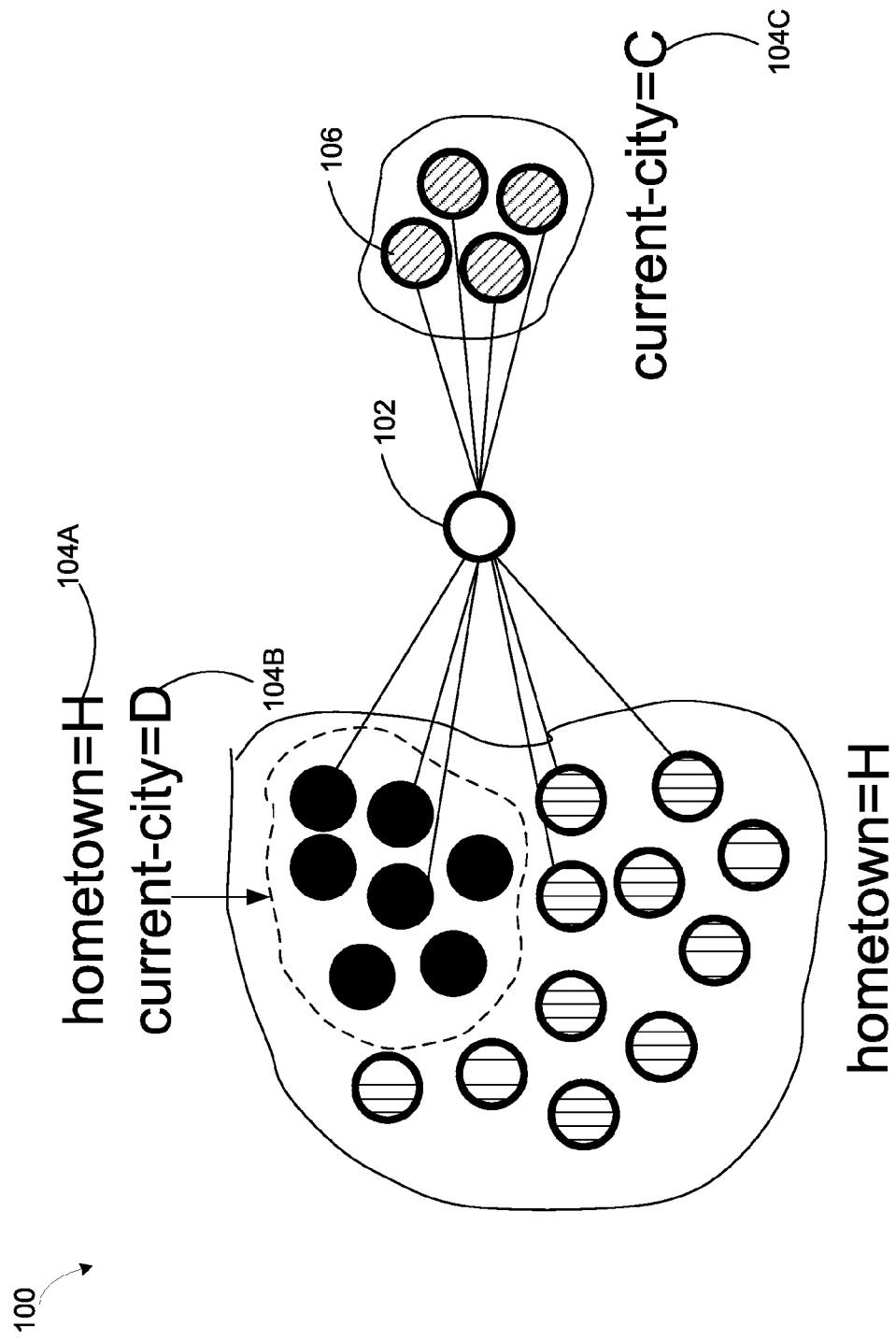
FIG. 1 is a schematic map diagram illustrating a social graph in a social networking system.

The figures depict various embodiments of this disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Embodiments are described for an inference system that is configured to infer user account attributes and/or demographics based on probable edge connection types (e.g., common attributes between user accounts and their neighboring social network nodes). The inference system iteratively computes probability scores (e.g., as continuous or discrete values between 0% and 100%, or other numeric ranges) corresponding to account attributes of nodes (e.g., user accounts) and their neighboring nodes in a social network graph. The probability scores can be initialized based on expressly specified values for some attributes, e.g., as reported by the user accounts as part of their profiles.

In various embodiments, the inference system then establishes "explainability" variable functions that measure how well each edge connection between a user node and a neighboring node (e.g., a "friend" or a group that the user node belong to) is explained by attributes that are common to the two nodes. The inference system implements a process that maximizes or otherwise optimizes "explainability" variable functions between a user node and neighboring nodes. In some embodiments, the inference system optimizes all explainability variable functions. The process can rank various account attributes (e.g., by calculating a probability score for each possible account attribute of the user node) for different label types depending on each possible account attribute's ability to maximize (or otherwise optimize) the "explainability" variable functions for social network edges (e.g., every edge) in an ego network of the user node.

This process may be applied to a single ego network (e.g., a subset of the social graph stemming from a single "focal user node"). That is, the process can rank possible account attributes for the focal user node based on the possible account attributes' ability to maximize or otherwise optimize all "explainability" variable functions corresponding to edges stemming from the focal user node. This process can be performed (e.g., concurrently, in series, or a combination thereof) for every ego network in the social networking system. When instances of the process complete computation of probability scores for possible account attributes of a focal user node, the process instance can share the probability scores with other process instances that may require information about the current focal user node (e.g., when the current focal user node is a "friend" node of another focal user node in another process instance). For example, each process instance can correspond to a focal user node. A first process instance can correspond to a first focal user node and a second process instance can correspond to a second focal user node that is a neighbor of the first focal user node. Whenever the first process instance shares its probability scores of the possible account attributes of the first focal user node with the second process instance, the second process instance can later re-compute probability scores of possible account attributes of the second focal user node based on the received probability scores (e.g., corresponding to the first focal user node that is a neighbor of the second focal user node). The iterative computation (e.g., upon sharing) enables the inference system to converge on probability scores that reflect the most likely attribute labels for user nodes within the social graph of the entire social networking system.

The inference system solves the problem of inferring labels for nodes in a graph (e.g., a social graph), when only some labels of some nodes are known (e.g., because of express indications or previously inferred values). For most graphs, although the set of potential labels may be very large, most potential labels belong to one or more known label types. For example, the inference system can be applied to infer label types, e.g., hometown, current-city, employers, etc. for users connected by a social network. As an example, when many of a user's friends have expressly indicated a particular hometown, the inference system may infer that a connected user has the same hometown. Other uses for this inference system may be applied outside of the social network context, e.g., inferring the genes whose expression causes the synthesis of proteins in a protein-protein interaction graph or inferring research interests of authors given the known interests of a few authors and a large co-authorship network. Label inference is particularly important for social networks since these labels can improve friend searches and guide friend recommendation systems, especially for new users. In addition, high-confidence inferences can be directly presented to users in various prompts encouraging them to complete their user profiles, leading to increased profile completion rates.

The inference system employs known labels of nodes in a social graph and social connections between such nodes to infer labels. Instead of taking the social graph as given or using conventional techniques of modeling labels as items that simply propagate over the social graph, the inference system employs for nodes the labels as factors that can explain the observed graph structure. For example, the conventional label propagation technique infers labels for a node u by looking at the popularity of labels within the ego graph of node u while leaving node u's friendships completely unexplained. The inference system rectifies this by inferring node labels such that for each friendship edge u~v, a reason for the friendship edge is also inferred. For example, a reason for the friendship edge may be because node u and node v are friends from the same hometown, same college, or the like. While the inference system infers label by maximizing explainability of each friendship edge, the inference system may also utilize the inferred reason for each friendship in other social networking applications. For example, if a new user u joins a social network and forms a friendship with v, knowledge of the reason can help guide friend recommendations, e.g., whether to recommend v's college friends or friends from the same hometown to user u.

The inference system reformulates the label inference problem as one of explaining the graph structure using the labels. The process of inferring labels explicitly accounts for the fact that labels belong to a limited set of label types, whose properties are enumerated and incorporated into a variational inference model. The variational inference model involves an iterative process which can be easily implemented in any large-scale message-passing architecture. For example, this feature enables a billion-node social network to infer attribute labels for user nodes using publicly available user profiles and friendships, where the recall of these inferred labels significantly outperforms the conventional label propagation technique with lifts (i.e., ratio of the percentage of recall of the inference system over the percentage of recall of the conventional label propagation technique) of up to 120% for recall (e.g., for the top possible attribute label in each attribute type). "Recall" in this context refers to the fraction of relevant attribute labels that match user confirmations.

Some embodiments of this disclosure have other aspects, elements, features, and steps in addition to or in place of what is described above. These potential additions and replacements are described throughout the rest of the specification Social Networking System Overview Social networking systems commonly provide mechanisms allowing users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and allowing users to interact with social networking system objects and information. For example, a social networking system may display a page for each social networking system user comprising objects and information entered by or related to the social networking system user (e.g., the user's "profile"). Social networking systems may also contain pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph includes a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or abstract idea.

A social networking system may allow a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may allow a user to upload or create pictures, videos, documents, songs, or other content items, and may allow a user to create and schedule events. Content items and events may be represented by nodes in the social graph.

A social networking system may provide a variety of means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may allow a user to email, instant message, or text/SMS message, one or more other users; may allow a user to post a message to the user's wall or profile or another user's wall or profile; may allow a user to post a message to a group or a fan page; or may allow a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may allow users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems allow users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with a particular user in order to determine or evaluate the social context of the communications of the particular user, as will be described below in greater detail.

Similarly, whereas common attributes can be used to infer implicit social connections, explicit social connections may also be used to infer common attributes between those social connections. The inference system leverages the explicit social connections and attribute labels that are explicitly reported by user nodes in a social graph to infer attribute labels for every node in the social graph.

Turning now to the figures, FIG. 1 is a schematic map diagram illustrating a social graph 100 in a social network. The illustrated social graph 100 is an ego network (e.g., a portion of a larger social graph where all social graph edges connect to a single focal user node 102). While all illustrated nodes in the social graph 100 are connected to the single focal user node 102, not all nodes are shown with lines connecting to the focal user node 102 for ease of illustration.

A conventional label propagation technique may infer labels in the social graph 100. The conventional label propagation technique tries to set the label probabilities of nodes so that friends have similar probabilities. This is achieved by minimizing a quadratic function of label probabilities over the edges of the graph. While this technique captures the essence of homophily, it fails to address the specifics of friendship formation in social networking systems. As an example, consider the focal user node 102 whose labels are completely unknown, but whose friends' labels (e.g., an attribute label 104A, an attribute label 104B, and an attribute label 104C, collectively as the "attribute labels 104") are completely known. For example, the attribute label 104A is a label of the label type "Hometown" that indicates that certain friend nodes (e.g., social graph nodes) originate from a hometown called "H." The attribute label 104B is a label of the label type "Current-City" that indicates that certain friend nodes currently reside in the city "D." The attribute label 104C is a label of the label type "Current-City" that indicates that certain friend nodes currently reside in the City "C."

The conventional label propagation technique would infer the hometown of the focal user node 102 to be the most common hometown among her friends, the current-city to be the most common current-city among friends, and so on. Hence, if the bulk of friends of the focal user node 102 are from her hometown H, then inferences for current-city will be dominated by the most common current-city among her hometown friends (say, D) and not friends from her actual current-city C; indeed, the same will happen for all other label types as well.

Accordingly, the conventional label propagation technique has an inherent flaw that may reduce the recall and precision of its attribute inference. A potential alternative may be to cluster the social graph, and then propagate only the most common labels within each cluster. However, (a) clustering based solely on the graph structure ignores labels already available from user profiles; (b) a multi-objective clustering approach that attempts to infer both clusters and missing labels is both unnecessary and difficult to scale, because clustering typically requires maintenance of neighborhood or global structures, which can be hard for billion-node graphs; and (c) the clustering must be complex enough to allow overlapping clusters (e.g., the solid-black nodes in FIG. 1 must belong to both the hometown H cluster and the current-city C' cluster), which not only increases the number of clusters and the complexity of clustering, but also suggests that the problem described above can recur in the clustered setting. For at least these reasons, the conventional label propagation technique is not as suitable in resolving the problems that is being solved by the disclosed inference system.

Figure 2:
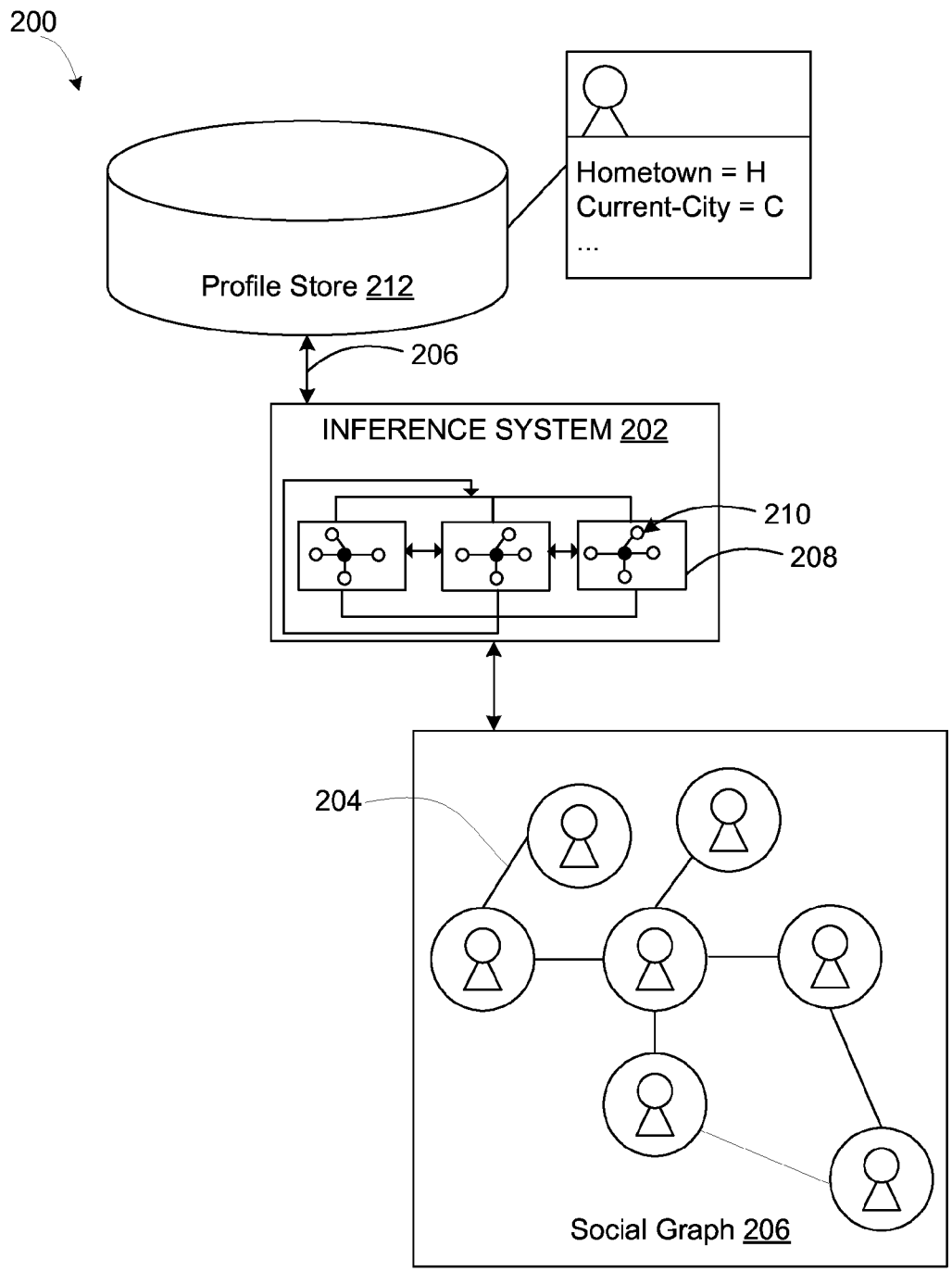
FIG. 2 is a block diagram illustrating a social networking system with a mechanism to infer social connection explanations and user node attributes, in accordance with various embodiments.

FIG. 2 is a block diagram illustrating a social networking system 200 with a mechanism to infer social connection explanations and user node attributes, in accordance with various embodiments. The social networking system 200 can include an inference system 202 that operates with or within the social networking system 200. The inference system 202 infers explanations for creating of social connections (e.g., a social graph edge 204) in a social graph 206 of the social networking system 200. The social graph 206 can be the social graph as described in the social networking system overview, containing connections (e.g., social graph edges) between different node entities, e.g., user accounts, social network pages, interest groups, and other entities.

The inference system 202 can run one or more inference process instances, each corresponding to an ego network 210 in the social graph 206. An inference process instance 208 receives inputs from both the social graph 206 and a profile store 212. In some embodiments, both user profiles and social graph edges can be stored in the same storage system, making the profile store 212 part of the data structure of the social graph 206. The inference process instance 208 can identify neighboring nodes to a focal user node in the ego network 210 from the social graph 206. The inference process instance 208 can also identify existing attribute labels stored in the profile store 212. Initially, the existing attribute labels may be explicit attribute labels reported by users of the social networking system 200. In later iterations of the inference process instance 208, the existing attribute labels can also be inferred attribute labels generated from a previous iteration of the inference process instances.

Based on the ego network 210 and the existing attribute labels, the inference process instance 208 can compute probability scores associated with possible attribute labels for the focal user node for different label types. These probability scores may be within a numeric range, e.g., floating point values from zero to one. In various embodiments, the probability scores for all possible attribute labels of a label type add up to the maximum score in the numeric range, e.g., adding up to 1. The social networking system 200 can utilize the probability scores to prompt its users to confirm the possible attribute labels. The social networking system 200 can also utilize the probability scores to rank top possible attribute labels (e.g., according to their probability scores) as "soft labels" that function similarly to explicit user-reported attribute labels when providing services to the users.

The inference process instance 208 can distribute probability scores to other inference process instances to facilitate their inferences of attribute labels for their focal user nodes. The inference process instance 208 can also receive newly updated probability scores associated with the neighboring nodes of the focal user node and/or user-reported label updates to compute the probability scores associated with the possible attribute labels of the focal user node of each label type.

For example, the inference system 202, and thus the inference process instance 208, may be configured to infer, for the users of the social networking system 200, attribute labels (e.g., "Palo Alto High School" and "Stanford University") corresponding to several label types (e.g., high school and college). The existing attribute labels may include labels that are publicly declared by some users. The desired set of label types may depend on specific services provided by the social networking system 200. In one specific example, the inference system 202 can focus on the label types of: hometown, high-school, college, current-city, and employer. These examples of label types may be suitable in improving friend recommendation in the social networking system 200.

In various embodiments, the inference system 202 models the social graph 206 based on three properties of the attribute labels. First ("P1"), the attribute labels should represent the primary situations where two people can meet and become friends. This property is a direct result of the application to infer attribute labels that facilitates friendship formation. Second ("P2"), the primary situations represented by the common attribute labels are mutually exclusive. The inference system 202 can consider the label types as a set of mutually exclusive and exhaustive "reasons" for friendship. In some cases, there are exceptions. For example, in the case of the label types "high-school" and "hometown," the label types may overlap at least partially. How to deal with this overlap is further discussed below. Third ("P3"), sharing the same attribute label should only be considered a necessary pre-requisite for such meetings, and not by any means sufficient. For example, "We are friends from Chicago" typically implies that the indicated individuals were, at some point in time, co-located in a small area within Chicago (say, lived in the same building, met in the same cafe). However, two randomly chosen individuals from Chicago are hardly likely to be friends just because of the shared attribute label of having the same current city. This means, the inference system 202 does not simply cast common attribute labels as features whose mere presence or absence significantly affects the probability of friendship; instead, the inference system 202 uses the mutually exclusive nature of possible attribute labels within a label type and amongst label types to infer attribute labels simultaneously with the social connection explanations.

The inference process instance 208 computes the probability scores based on the following three equations:

$$\text{Maximize} \sum_{u \sim v} \text{softmax}_{t \in T}(r(u, v, t)) \qquad \text{Eq. (1)}$$

$$r(u, v, t) = \sum_{l \in L(t)} f_{ul} f_{vl} \qquad \text{Eq. (2)}$$

$$\text{softmax}_{t \in T}(r(u, v, t)) = \sigma\left(\alpha \sum_{t \in T} r(u, v, t) + c\right) \qquad \text{Eq. (3)}$$

Here, "u" can represent the focal user node, and "v" can represent one of the neighboring nodes to the focal user node in the ego network 210, and "t" can represent one of the label types that the inference system 202 is analyzing. Here, r(u,v,t) is a variational function that measures the degree to which a shared label type t is the reason underlying the edge u~v. Computationally, the inference process instance 208 can model the variational function as the total probability that u and v both have the same label for a given label type t (e.g., Eq. (2)). The inference system 202 can configure the softmax $(r_1, \ldots, r_{|T|})$ function to have three properties: (a) it can be monotonically non-decreasing in each argument; (b) it can achieve a value close to its maximum as long as any one of its parameters/arguments is "high", and (c) it can be differentiable, for ease of analysis. For example in Eq. (3), the inference system 202 can be configured with the sigmoid function $\sigma(x)$ to implement this: $\sigma(x)=1/(1+e^{-x})$. In other embodiments, other functions satisfying the three properties may be used instead of the sigmoid function. The sigmoid function monotonically increases from 0 to 1, and achieves values greater than 1–ξ once x is greater than a threshold (ξ). In addition, the sigmoid function enables fine control of the degree of "explanation" required for each edge (discussed below), yields a fast variational inference method, and allows for easy extensions to more complex label types and extra features, all of which make it a good choice for the softmax function.

Eq. (1) is maximized if the softmax function achieves a high value for each edge u~v, i.e., if each edge is "explained." This is achieved if the sum $\Sigma_{t \in T} r(u,v,t)$ is more than the required threshold, which in turn is satisfied if the product $f_{ul} f_{vl}$ is high for even one label l—in other words, when there exists any label l that both u and v are likely to share. Here, $f_{ul}$ represents the likelihood that a user u has a label l and $f_{vl}$ q represents the likelihood that a user v has a label l. The parameter α can be used to control the degree of explanation needed for each edge. A small α forces the inference process instance 208 to be very sure that u and v share one or more labels, while for a large α, a single matching label is enough to achieve the high value for the edge u~v.

In short, Eq. (2) encapsulates property (P1) by trying to have matching labels between friends; Eq. (3) models property (P2) by enabling any one label type to explain each friendship; and the form of the optimization function Eq. (1) uses only existing edges u~v and not all node pairs, and thus satisfying property (P3). For example, two nodes with "Chicago" as their current-city who are not friends are not considered under the scheme laid out for the inference process instance 208, which reflects the idea that matching label types are necessary but not sufficient.

For example, solving for Eq. 1 using Eq. 2 and Eq. 3 (e.g., utilizing a sigmoid function), the probability score ($\mu_{ukm}$) of an attribute label m of user u for label type k may be expressed as:

$$\mu^*_{ukm} \alpha \; \exp\left\{\sum_{u \sim v} \mu_{vkm} \prod_{t \neq k}\left(1 - (1 - e^{-\alpha}) \sum_{l \in L(t)} \mu_{utl} \mu_{vtl}\right)\right\} \qquad \text{Eq. (4)}$$

Thus, the effect of each friend v on the probability score comes from at least two sources: (a) $\mu_{vkm}$, which is high if v is likely to have the label m, and (b) the product term, which is 1 if there is no matching label from other label types, but can be much lower if u and v share a label from even one other label type. This is the desired behavior in accordance with properties P1-P3. The effect of shared labels from other label types on the product term is magnified when α is large.

To summarize, the inference procedure picks an explainability score for each edge u~v to maximize, and then sets $\mu_{utl}$ (the probability distributions of possible attribute labels) that maximizes all of the explainability scores for all edges from the node u. Solving for the probability distributions of the possible attribute labels requires information from all of u's friendships and solving for the explainability scores requires information about both the probability distributions of the user u and of the neighboring users v. This scheme can be implemented in any large-scale message-passing architecture.

FIG. 1 considers a node u (e.g., the focal user node 102) whose labels are completely unknown, but whose friends' labels are completely known. The inference system 202 resolves the challenges faced by the conventional label propagation technique. The conventional label propagation technique infers the hometown of u to be the most common hometown among her friends (i.e., H), the current-city to be the most common current-city among friends (i.e., D), and so on. However, such an inference leaves u's friendships from C completely unexplained. The inference process instance 208 rectifies this: Eq. (1) will be maximized by correctly inferring H and C as u's hometown and current-city respectively, because H is enough to explain all friendships with the hometown friends, and the marginal extra benefit obtained from explaining these same friendships a little better by using D as u's current-city is outweighed by the significant benefits obtained from explaining all the friendships from C by setting u's current-city to be C.

Effect of $\alpha$.

With large $\alpha$, a single matching label is enough to explain an edge, while with small $\alpha$, multiple matching labels may be needed. It has been discovered that the lift in recall for the top inferred attribute label improves with increasing $\alpha$. In particular, it has been discovered that $\alpha \in [5,10]$ offers high recall for the inferred attribute labels. Thus, the outperformance of large $\alpha$ reflects validation of property (P2). Thus, the outperformance of large $\alpha$ provides strong empirical validation of property (P2).

Relating Label Types.

Property (P2) assumes that the reasons for friendship formation are mutually exclusive, but this need not be strictly true. For example, high-school friends could be considered a subset of hometown friends. The relationship between high-school and hometown may also be more complex (e.g., the high-school could be within driving distance of the hometown, but not in it). This may be illustrated by considering an ego network similar to the social graph 100 of FIG. 1, but with the attribute labels for the "current-city" label type replaced by the "high-school" label type. Suppose that the solid-black nodes in FIG. 1 represent actual high-school friends, and the inference process instance 208 is trying to infer the focal user node 102's high-school. If all friendships can be explained by a non-high-school label type, Eq. (1) is maximized by picking the most common high-school among u's friends (i.e., the solid-black nodes), even if they are already explained by a shared hometown; thus, the inference process instance 208 picks the correct high-school. On the other hand, if some friendships would remain unexplained without a shared high-school (e.g., the small cluster in FIG. 1), then there is a question whether the inference process instance 208 would prefer a high-school that explains these edges or a high-school that represents a large segment of hometown friends. Hence, the parameter $\alpha$ in Eq. (3) can be configured with a threshold such that a large enough segment of the latter (e.g., hometown friends) is able to overwhelm a small set of the former (e.g., high school friends). The choice of $\alpha$ may depend on the characteristics of the social networking system 200.

Incorporating Extra Features.

The inference process instance 208 may be generalized to broader settings with multiple user features, e.g., to take into account group memberships, topics of interest, keywords, or pages liked by the user. As an example, the social networking system 200 may be able to account for the possibility that users can establish memberships in one or more social groups. For example, if most members of a social group come from the same college, then the social group is likely a college-friends group. Based on this information, the inference process instance 208 can infer a college label (e.g., the college of most members in the social group) for group members of the social group whose college is unknown. For example, the inference system 202 can create a special node for each social group, and create "friendship" edges between the social group node and its members. The inference process instance 208 can infer labels for the group node as well, and can explain its "friendships" via a specific label of the label type "college." This, in turn, can influence inference for group members with unknown labels for the "college" label type.

By modeling properties (P1)-(P3), the inference system 202 is able to better explain the social network, and hence better infer labels in an iterative fashion, as compared to the conventional label propagation technique. Additionally, the inference system 202 may be extended to account for: (a) matching interests, and (b) friendships via introductions.

For example, in addition to identifying common attributes between neighboring nodes, the inference system 202 can model friendship formation by accounting for shared interest is at least the following two steps: (a) u and v meet and interact, and then (b) choose to become friends if their interests match. The first step succeeds if there is even one situation where u and v interact—whether at high-school, or current-city, or college, etc.—as described above. The second step is more likely to succeed if there are more shared interests, and hence the inference maximizes all instances of shared interests instead of utilizing a softmax function (as in Eq. 3). Part (a) encapsulates the "we are friends from" concept while part (b) represents the "we are friends because" concept; these are two distinct aspects of friendship formation, and modeling both would give a fuller understanding of the label inference process.

For social networks, introductions constitute another avenue for friendship formation (i.e., u becomes friends with v after being introduced by a mutual friend w). For example, friendship through introduction can be made through spouses and other family members. In such cases, the inference system 202 may be modified to maximize the possibility of either the pair (u,w) or the pair (v,w) to share a label, but not necessarily both pairs. When a spousal (or familial) relation between u and w is known, the optimization function can be adapted to explain both u~v and w~v, for example by:

$$P(u\sim v, w\sim v|\text{spouse}(u,w)) = \text{softmax}(P(u\sim v), P(w\sim v)) \qquad \text{Eq. (5)}$$

Edge-Specific Features.

In some embodiments, the inference process instance 208 can utilize edge specific features in making inferences of attribute labels. First, the inference process instance 208 can place additional weight to certain kinds of edges, e.g., the group-membership edges mentioned above. Second, some edge-specific features can be important for one label type but not another. For example, the age difference between friends is useful for inferring high-school but not employer. The first set of situations can be handled by the inference process instance 208 by modifying Eq. (2) to include an edge-specific weight. The second set of situations can be handled by configuring the edge specific weight as a function of label type.

Messaging Between Inference Process Instances.

The inference process instance 208 can be implemented by an iterative graph processing system based on a Bulk Synchronous Processing (BSP) model. In some embodiments, the entire set of nodes to be processed by the inference system 202 is split among two or more machines (e.g., 200 machines), and in each iteration, every node u sends the probability distributions "$\mu_{u\cdot\cdot}$" to all friends of u. Here, "$\mu_{u\cdot\cdot}$" refers to the probability distributions of possible attribute labels for node u, e.g., one probability distribution for each label type. In some embodiments, to limit the communication overhead, the inference process instance 208 is configured with at least one or more of these features: (a) for each user u and label type t, the multinomial distribution "$\mu_{ut}$" is clipped to retain only a top M number of entries (e.g., top 16 attribute labels of the label type t), and (b) the ego network is reduced (e.g., the friendship graph is sparsified) so as to retain, for each user u, the top K friends, as the neighboring nodes to the user u, whose ages are closest to that of u. This feature is advantageous because friends of similar age are more likely to share certain label types, e.g., high-school and college. It has been discovered that this feature retains the accuracy of the inference process while significantly improving running time.

The recall of the inference process of the inference system 202 may increase up to a certain K value, and then decrease. For example, it has been discovered that the recall increases to K=100, for the top ranked attribute label in each label type and then decreases, and increases to K=200, for the top three attribute labels each label type and then decreases. This demonstrates both the importance and the limits of scalability: increasing the number of friends enables better inference but beyond a point, more friends may increase noise. For example, some of the additionally added friendships may be due to other factors other than common attributes, e.g., through introductions or common interests.

Figure 3:
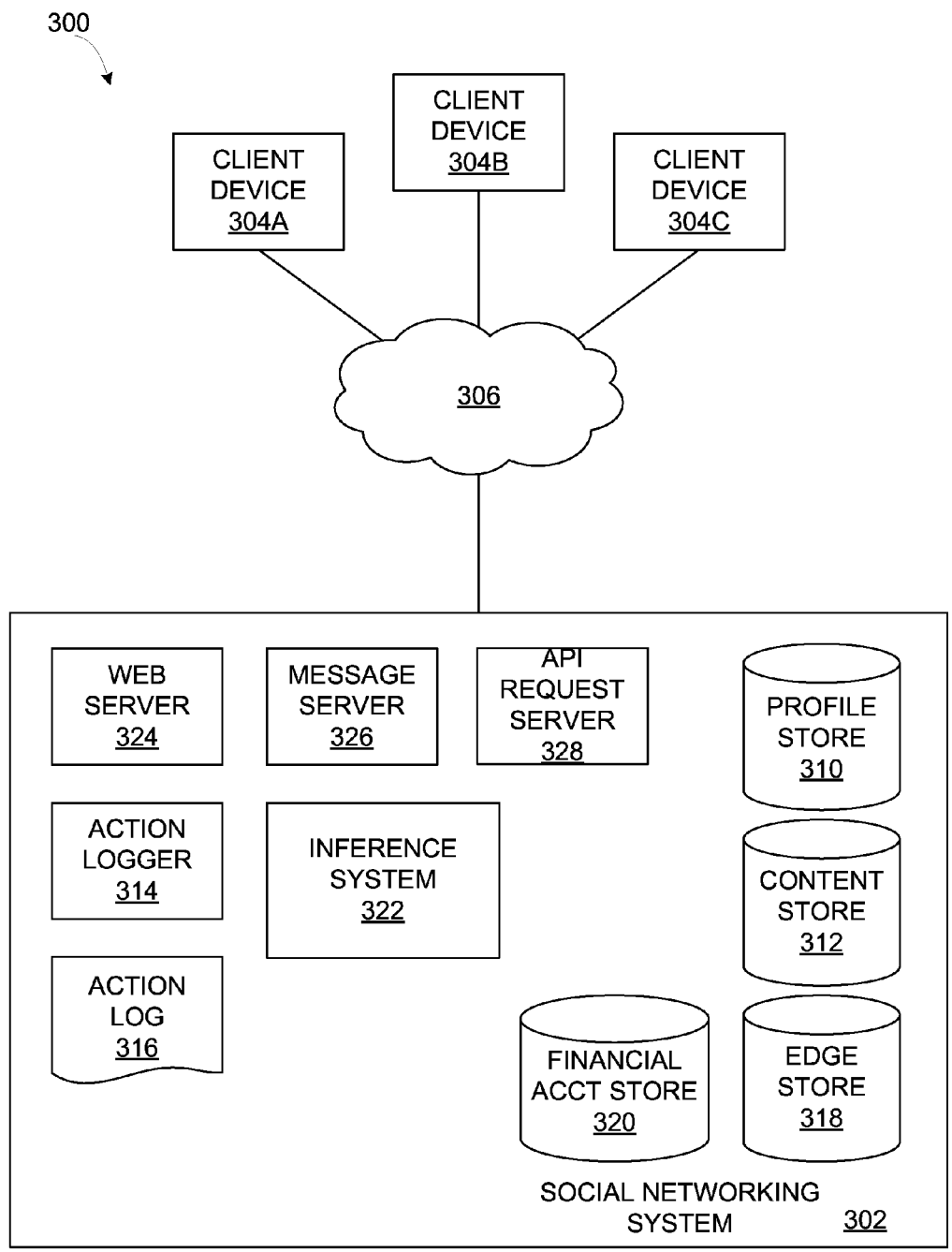
FIG. 3 is a high level block diagram of a system environment suitable for a social networking system, in accordance with various embodiments.

FIG. 3 is a high level block diagram of a system environment 300 suitable for a social networking system 302, in accordance with various embodiments. The system environment 300 shown in FIG. 3 includes the social networking system 302 (e.g., the social networking system 200 of FIG. 2), a client device 304A, and a network channel 306. The system environment 300 can include other client devices as well, e.g., a client device 304B and a client device 304C. In other embodiments, the system environment 300 may include different and/or additional components than those shown by FIG. 3.

Social Networking System Environment and Architecture

The social networking system 302, further described below, comprises one or more computing devices storing user profiles associated with users and/or other objects as well as connections between users and other users and/or objects. Users join the social networking system 302 and then add connections to other users or objects of the social networking system to which they desire to be connected. Users of the social networking system 302 may be individuals or entities, e.g., businesses, organizations, universities, manufacturers, etc. The social networking system 302 enables its users to interact with each other as well as with other objects maintained by the social networking system 302. In some embodiments, the social networking system 302 enables users to interact with third-party websites and a financial account provider.

Based on stored data about users, objects and connections between users and/or objects, the social networking system 302 generates and maintains a "social graph" comprising multiple nodes interconnected by multiple edges. This social graph can be the social graph 206 of FIG. 2. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 302 adds and/or modifies edges connecting the various nodes to reflect the interactions.

The client device 304A is a computing device capable of receiving user input as well as transmitting and/or receiving data via the network channel 306. In at least one embodiment, the client device 304A is a conventional computer system, e.g., a desktop or laptop computer. In another embodiment, the client device 304A may be a device having computer functionality, e.g., a personal digital assistant (PDA), mobile telephone, a tablet, a smart-phone or similar device. In yet another embodiment, the client device 304A can be a virtualized desktop running on a cloud computing service. The client device 304A is configured to communicate with the social networking system 302 via a network 306 (e.g., an intranet or the Internet). In at least one embodiment, the client device 304A executes an application allowing a user of the client device 304A to interact with the social networking system 302. For example, the client device 304A executes a browser application to enable interaction between the client device 304A and the social networking system 302 via the network 306. In another embodiment, a the client device 304A interacts with the social networking system 302 through an application programming interface (API) that runs on the native operating system of the client device 304A, e.g., IOS® or ANDROID™.

The client device 304A is configured to communicate via the network 306, which may comprise any combination of local area and/or wide area networks, using both wired and wireless communication systems. In at least one embodiment, the network channel 306 uses standard communications technologies and/or protocols. Thus, the network channel 306 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 306 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 306 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 302 includes a profile store 310, a content store 312, an action logger 314, an action log 316, an edge store 318, a financial account store 320, an inference system 322, a web server 324, a message server 326, and an API request server 328. In other embodiments, the social networking system 302 may include additional, fewer, or different modules for various applications. Conventional components, e.g., network interfaces, security mechanisms, load balancers, failover servers, management and network operations consoles, and the like are not shown so as to not obscure the details of the system architecture.

User of the social networking system 302 can be associated with a user profile, which is stored in the profile store 310 (e.g., the profile store 212 of FIG. 2). A user profile includes declarative information about the user that was explicitly shared by the user, and may also include profile information inferred by the social networking system 302. In some embodiments, a user profile includes multiple data fields, each data field describing one or more attributes of the corresponding user of the social networking system 302. The user profile information stored in the profile store 310 describes the users of the social networking system 302, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 302 displayed in an image. A user profile in the profile store 310 may also maintain references to actions by the corresponding user performed on content items (e.g., items in the content store 312) and stored in the edge store 318 or the action log 316.

As further described below, a user profile may be associated with one or more financial accounts, allowing the user profile to include data retrieved from or derived from a financial account. A user may specify one or more privacy settings, which are stored in the user profile, that limit information from a financial account that the social networking system 302 is permitted to access. For example, a privacy setting limits the social networking system 302 to accessing the transaction history of the financial account and not the current account balance. As another example, a privacy setting limits the social networking system 302 to a subset of the transaction history of the financial account, allowing the social networking system 302 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 302. In some embodiments, information from the financial account is stored in the profile store 310. In other embodiments, it may be stored in the financial account store 320.

The content store 312 stores content items associated with a user profile, e.g., images, videos or audio files. Content items from the content store 312 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 302. Examples of social networking content items include suggested connections or suggestions to perform other actions, media provided to, or maintained by, the social networking system 302 (e.g., pictures or videos), status messages or links posted by users to the social networking system, events, groups, pages (e.g., representing an organization or commercial entity), and any other content provided by, or accessible via, the social networking system.

The content store 312 also includes one or more pages associated with entities having user profiles in the profile store 310. An entity can be a non-individual user of the social networking system 302, e.g., a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 312, allowing social networking system users to more easily interact with the vendor via the social networking system 302. A vendor identifier is associated with a vendor's page, thereby enabling the social networking system 302 to identify the vendor and/or to retrieve additional information about the vendor from the profile store 310, the action log 316 or from any other suitable source using the vendor identifier. In some embodiments, the content store 312 may also store one or more targeting criteria associated with stored objects and identifying one or more characteristics of a user to which the object is eligible to be presented.

The action logger 314 receives communications about user actions on and/or off the social networking system 302, populating the action log 316 with information about user actions. Such actions may include, for example, adding a connection to another user, sending a message to another user, uploading an image, reading a message from another user, viewing content associated with another user, attending an event posted by another user, among others. In some embodiments, the action logger 314 receives, subject to one or more privacy settings, transaction information from a financial account associated with a user and identifies user actions from the transaction information. For example, the action logger 314 retrieves vendor identifiers from the financial account's transaction history and identifies an object, e.g., a page, in the social networking system associated with the vendor identifier. This enables the action logger 314 to identify a user's purchases of products or services that are associated with a page, or another object, in the content store 312. In addition, a number of actions described in connection with other objects are directed at particular users, so these actions are associated with those users as well. These actions are stored in the action log 316.

In accordance with various embodiments, the action logger 314 is capable of receiving communications from the web server 324 about user actions on and/or off the social networking system 302. The action logger 314 populates the action log 316 with information about user actions to track them. This information may be subject to privacy settings associated with the user. Any action that a particular user takes with respect to another user is associated with each user's profile, through information maintained in a database or other data repository, e.g., the action log 316. Such actions may include, for example, adding a connection to the other user, sending a message to the other user, reading a message from the other user, viewing content associated with the other user, attending an event posted by another user, being tagged in photos with another user, liking an entity, etc.

The action log 316 may be used by the social networking system 302 to track user actions on the social networking system 302, as well as external website that communicate information to the social networking system 302. Users may interact with various objects on the social networking system 302, including commenting on posts, sharing links, and checking-in to physical locations via a mobile device, accessing content items in a sequence or other interactions. Information describing these actions is stored in the action log 316. Additional examples of interactions with objects on the social networking system 302 included in the action log 316 include commenting on a photo album, communications between users, becoming a fan of a musician, adding an event to a calendar, joining a groups, becoming a fan of a brand page, creating an event, authorizing an application, using an application and engaging in a transaction. Additionally, the action log 316 records a user's interactions with advertisements on the social networking system 302 as well as applications operating on the social networking system 302. In some embodiments, data from the action log 316 is used to infer interests or preferences of the user, augmenting the interests included in the user profile and allowing a more complete understanding of user preferences.

Further, user actions that happened in particular context, e.g., when the user was shown or was seen accessing particular content on the social networking system 302, can be captured along with the particular context and logged. For example, a particular user could be shown/not-shown information regarding candidate users every time the particular user accessed the social networking system 302 for a fixed period of time. Any actions taken by the user during this period of time are logged along with the context information (i.e., candidate users were provided/not provided to the particular user) and are recorded in the action log 316. In addition, a number of actions described below in connection with other objects are directed at particular users, so these actions are associated with those users as well.

The action log 316 may also store user actions taken on external websites and/or determined from a financial account associated with the user. For example, an e-commerce website that primarily sells sporting equipment at bargain prices may recognize a user of the social networking system 302 through social plug-ins that enable the e-commerce website to identify the user of the social networking system 302. Because users of the social networking system 302 are uniquely identifiable, e-commerce websites, e.g., this sporting equipment retailer, may use the information about these users as they visit their websites. The action log 316 records data about these users, including webpage viewing histories, advertisements that were engaged, purchases made, and other patterns from shopping and buying. Actions identified by the action logger 314 from the transaction history of a financial account associated with the user allow the action log 316 to record further information about additional types of user actions.

In some embodiments, the edge store 318 stores the information describing connections between users and other objects on the social networking system 302 in edge objects. The edge store 318 can store the social graph described above, e.g., the social graph 206 of FIG. 2. Some edges may be defined by users, allowing users to specify their relationships with other users. For example, users may generate edges with other users that parallel the users' real-life relationships, e.g., friends, co-workers, partners, and so forth. Other edges are generated when users interact with objects in the social networking system 302, e.g., expressing interest in a page on the social networking system, sharing a link with other users of the social networking system, and commenting on posts made by other users of the social networking system. The edge store 318 stores edge objects that include information about the edge, e.g., affinity scores for objects, interests, and other users. Affinity scores may be computed by the social networking system 302 over time to approximate a user's affinity for an object, interest, and other users in the social networking system 302 based on the actions performed by the user. Multiple interactions of the same type between a user and a specific object may be stored in one edge object in the edge store 318, in at least one embodiment. In some embodiments, connections between users may be stored in the profile store 310. In some embodiments, the profile store 310 may reference or be referenced by the edge store 318 to determine connections between users. Users may select from predefined types of connections, or define their own connection types as needed.

The web server 324 links the social networking system 302 via a network to one or more client devices; the web server 324 serves web pages, as well as other web-related content, e.g., Java, Flash, XML, and so forth. The web server 324 may communicate with the message server 326 that provides the functionality of receiving and routing messages between the social networking system 302 and client devices. The messages processed by the message server 326 can be instant messages, email messages, text and SMS (short message service) messages, photos, or any other suitable messaging technique. In some embodiments, a message sent by a user to another user can be viewed by other users of the social networking system 302, for example, by the connections of the user receiving the message. An example of a type of message that can be viewed by other users of the social networking system besides the recipient of the message is a wall post. In some embodiments, a user can send a private message to another user that can only be retrieved by the other user.

The application program interface (API) request server 328 enables external systems to access information from the social networking system 302 by calling APIs. The information provided by the social network may include user profile information or the connection information of users as determined by their individual privacy settings. For example, a system interested in predicting the probability of users forming a connection within a social networking system may send an API request to the social networking system 302 via a network. The API request is received at the social networking system 302 by the API request server 328. The API request server 328 processes the request by determining the appropriate response, which is then communicated back to the requesting system via a network.

The social networking system 302 can also include the inference system 322. The inference system 322 can be the inference system 202 of FIG. 2. In other embodiments, the inference system 322 is separate from the social networking system 302. The inference system 322 can access the stores and modules of the social networking system 302 to infer attribute labels for user nodes and infer reasons explaining social connections between the user nodes. As the inference system 322 computes probability scores for possible attribute labels, the social networking system 302 or the inference system 322 can further choose a subset of the possible attribute labels as "implicit" attributes of user nodes based on the computed probability scores. The inference system 322 can store a portion or all of the chosen implicit attributes, the computed probability scores, or both. The computed probability scores and/or top attribute labels of each labeled type (having high likelihood according to the computed probability scores) can be saved into the profile store 310. The inference system 322 can further store the inferred reasons explaining friendship formations of social graph edges in the edge store 318. The inference system 322 can work with other modules and stores of the social networking system 302 to utilize the computed probability scores, the chosen implicit attributes, the inferred reasons for friendship formations, or any combination thereof (e.g., for friendship recommendation, affiliation suggestion, label suggestion, advertisement, etc.).

The inference system 322 can be implemented by a computer system with at least one processor and one non-transitory memory. The inference system 322 can also be on the same computer system as the social networking system 200 of FIG. 2 or the social networking system 302 of FIG. 3. The inference system 322 can be implemented by a computer system according to FIG. 8.

The inference system 322 can include one or more methods of inferring reasons for friendship formations and possible attribute labels for users in a social graph. The one or more methods can be implemented by data storages and modules described herein. The modules can be implemented as hardware components, software components, or any combination thereof. For example, the modules described can be software components implemented as instructions on a non-transitory memory capable of being executed by a processor or a controller on a machine described in FIG. 8. For another example, the methods and other techniques introduced in the modules above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module. Each of the data storages can operate individually and independently of other data storages. Some or all of the data storages can be combined as one data storage. A single data storage can also be divided into sub-storages, each containing a portion of the single data storage.

The storages or "stores", described below are hardware components or portions of hardware components for storing digital data. Each of the storage can be a single physical entity or distributed through multiple physical devices. Each of the storage can be on separate physical devices or share the same physical device or devices. Each of the stores can allocate specific storage spaces for run-time applications.

The inference system 322 or the social networking system 302 can include additional, fewer, or different modules for various applications. Conventional components, e.g., network interfaces, security functions, load balancers, failover servers, management and network operations consoles, and the like are not shown so as to not obscure the details of the system.

Figure 4A:
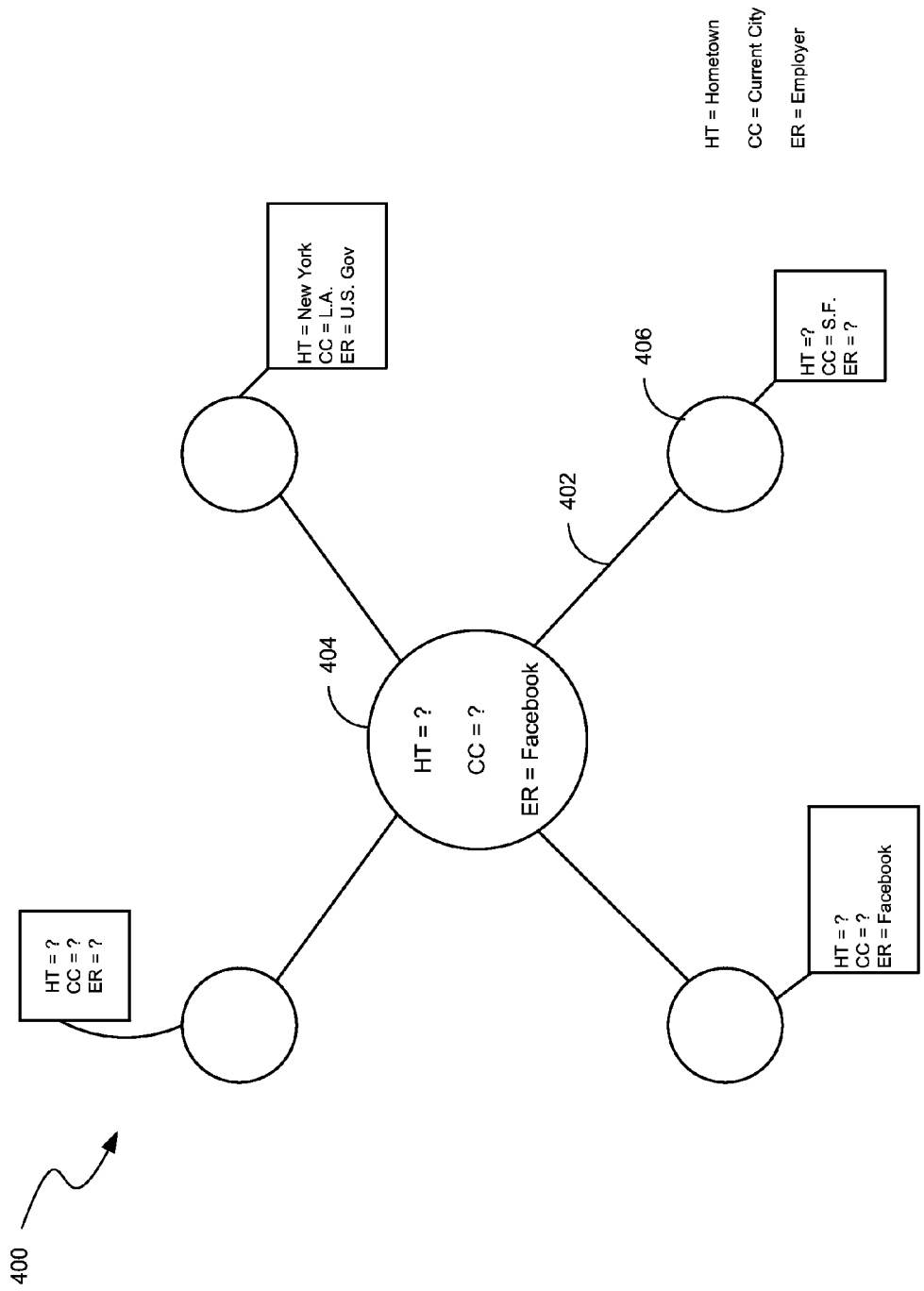
FIG. 4A is a schematic diagram illustrating an ego network within a social graph of a social networking system where some attributes of social nodes are unavailable.

FIG. 4A is a diagram illustrating an ego network 400 within a social graph of a social networking system where some attributes of social nodes are unavailable. The ego network 400 illustrates a portion of the social graph in the social networking system (e.g., the social networking system 200 of FIG. 2 or the social networking system 302 of FIG. 3). The ego network 400 is an example of a typical ego network in the social graph. Most users do not specify every attribute label associated with himself/herself. Hence, a typical ego network has some attribute labels that are available and some that are not.

Without a label inference system (e.g., the inference system 202 of FIG. 2 or the inference system 322 of FIG. 3), whenever a social connection 402 is formed between two users, e.g., a focal user 404 and a neighboring user 406, the social networking system would have no information regarding the reason why the social connection 402 is formed. In the rare exception that both the focal user 404 and the neighboring user 406 have published attribute labels in every label type in their profiles, the social networking system can identify common attribute labels between the users that may serve as a hint to the reason for the friendship formation. However, when there are more than one common attribute label, the social networking system would have no way of selecting one common attribute label as the reason over another.

Figure 4B:
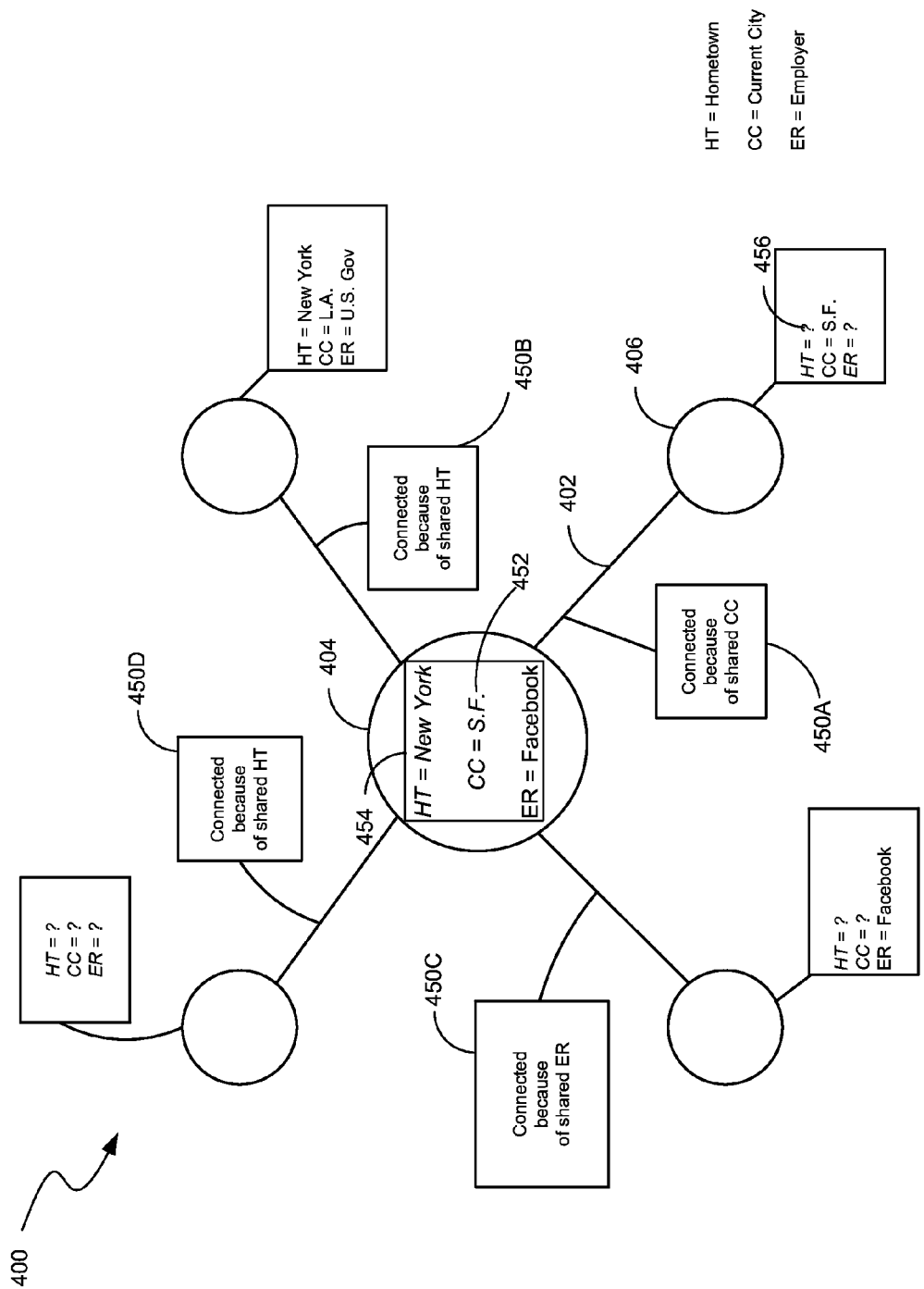
FIG. 4B is a schematic diagram illustrating the ego network of FIG. 4A with social graph connections labeled with reasons and with inferred attribute labels added to a node profile of the focal user, in accordance with various embodiments.

FIG. 4B is a diagram illustrating the ego network 400 of FIG. 4A with social graph connections labeled with reasons (e.g., a reason label 450A, a reason label 450B, a reason label 450C, and a reason label 450D) and with inferred attribute labels (e.g., an inferred attribute label 452 shown as italicized) added to a node profile 454 of the focal user 404, in accordance with various embodiments. For example, the reason label 450A may be explain why a social connection (e.g., the social connection 402) is form. The reason label 450A can indicate a common attribute between the focal user 404 and the neighboring user 406.

The ego network 400 illustrates the portion of the social graph in FIG. 4A that has been labeled by a label inference system (e.g., the inference system 202 or the inference system 322). As shown in FIG. 4B, the label inference system have labeled those label types that were unlabeled previously as shown in FIG. 4A. In some embodiments, instead of storing a single inferred label for each label type, the label inference system can store, for label types, a ranked list of possible attribute labels according to their likelihood of being true (e.g., probability scores computed by the label inference system). In some embodiments, the label inference system can also store labels for the reasons of friendship formation, including the social connection 402. The reasons of friendship formation can either be stored permanently on the social networking system, or be computed on the fly utilizing the label inference system.

Figure 4C:
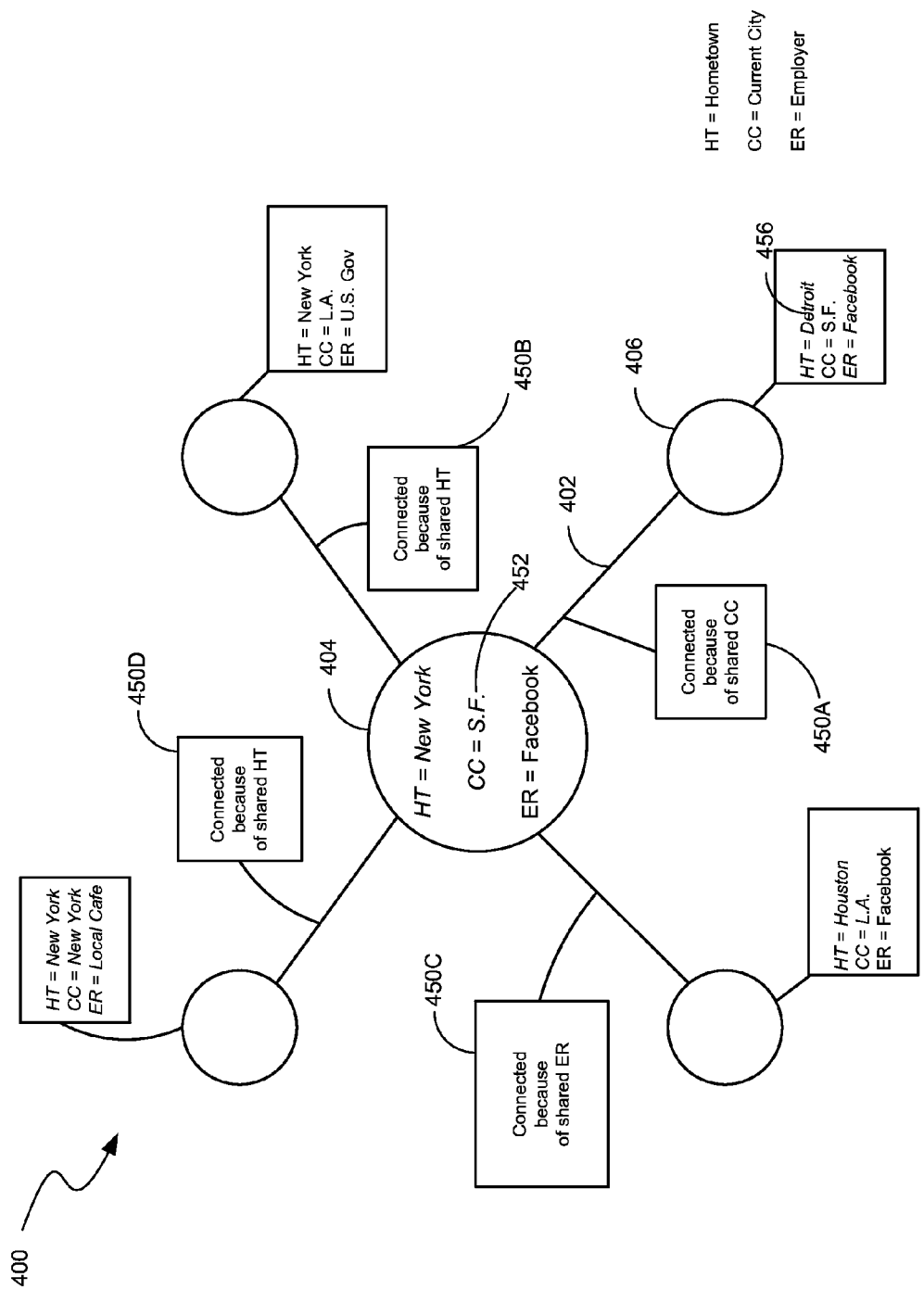
FIG. 4C is a schematic diagram illustrating the ego network of FIG. 4A after an inference system has completed labeling the entire social graph, in accordance with various embodiments.

The inference system can infer labels jointly between ego networks within the social graph. For example, while only the current-city of the neighboring node 406 is explicitly reported by a user, an inference process instance working on an ego network around the neighboring node may have already computed at least one iteration of probability distributions 456 (shown as a question mark in FIG. 4B and italicized "HT=Detroit" in FIG. 4C) associated with possible attribute labels for the neighboring node 406. For example, FIG. 4C is a diagram illustrating the ego network of FIG. 4A after an inference system (e.g., including multiple inference process instances for multiple ego networks) has completed labeling the entire social graph, in accordance with various embodiments. As shown, the top ranking inferred labels are saved to the respective node profiles of every node in the social graph (e.g., including the ego network 400).

Figure 5:
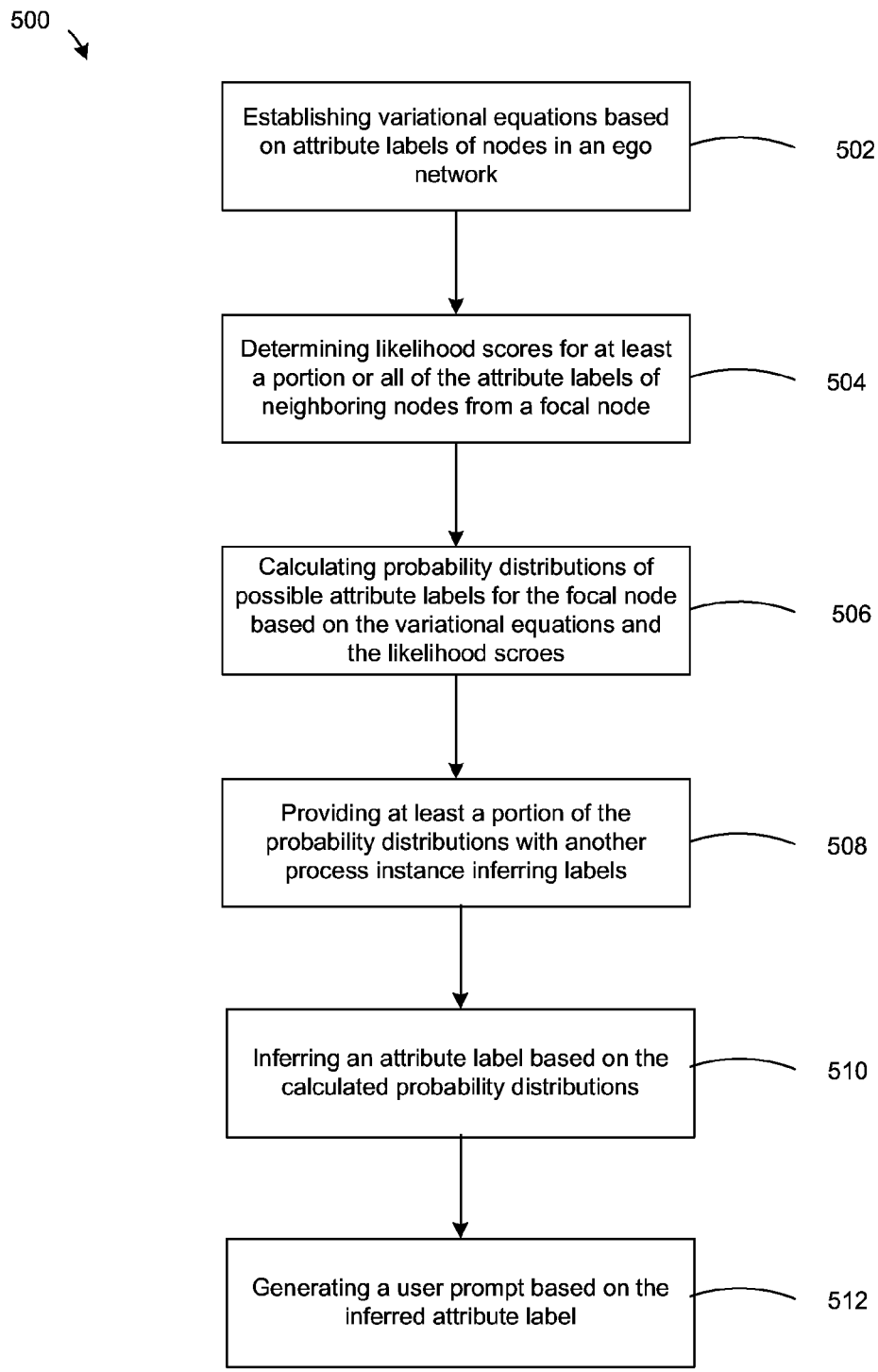
FIG. 5 is a flow chart of a method of operating an inference system to iteratively determine likelihood of possible attribute labels for nodes of a social graph, in accordance with various embodiments.

FIG. 5 is a flow chart of a method 500 of operating an inference system to iteratively determine likelihood of possible attribute labels for nodes of a social graph, in accordance with various embodiments. The method 500 can be performed by an inference system, e.g., the inference system 202 of FIG. 2 or the inference system 322 of FIG. 3. The method 500 may be implemented by one or more computing devices (e.g., the computing device 800 of FIG. 8). The method 500 may be in accordance with the method 600 of FIG. 6.

The method 500 begins with establishing variational equations (e.g., Eq. 1, Eq. 2, and Eq. 3) based on attribute labels of nodes in an ego network at block 502. The ego network can be in a social graph of a social networking system (e.g., the social networking system 200 of FIG. 2 or the social networking system 302 of FIG. 3). At block 504, the inference system determines and sets likelihood scores for at least a portion or all of the attribute labels of neighboring nodes of a focal user node of the ego network based on known attribute labels (e.g., user-specified attribute labels) from the social networking system. For example, this can be accomplished by collecting attribute label information of nodes in the ego network from the social networking system. The attribute label information can include known attribute labels as published by the users (e.g., the focal user node of the ego network or neighboring nodes of the focal user node). The attribute label information may also include previously computed probability distributions, scores, or rankings of the likelihood of possible attribute labels for each label type of the neighboring nodes. The logic of 504 may be performed, before, after, or in parallel to the logic of 502.

The probability distributions may be in the form of probability scores, discrete or continuous, for each possible attribute label. The probability distributions may also be in the form a ranking of possible attribute labels within an attribute label type (e.g., each label type). When there are no previously computed probability distributions of the possible attribute labels of the label types of the neighboring nodes, the probability distribution may be initialized using a heuristic rule. For example, when a user has explicitly reported an attribute label (e.g., a known attribute label) matching a possible attribute label, the probability score of the possible attribute label is set to the maximum (e.g., 1); when the user has explicitly reported an attribute label different from the possible attribute label in the same label type, the probability score of the possible attribute label is set to the minimum (e.g., 0); and when a user has not explicitly reported an attribute label in the same label type, the probability score of the possible attribute label is set to a nominal value between the maximum and the minimum.

At block 506, the inference system can compute probability distributions of possible attribute labels for the focal user node. For example, the inference system can compute the probability distributions based on the variational equations and the likelihood scores (e.g., based on Equations 1-3). The inference system can iterate through the possible attribute labels for the focal user node to determine how well each possible attribute label is able to explain the friendships (e.g., social connections) in the ego network.

At block 508, at least a portion of the probability distributions are provided to (e.g., shared with) another process instance (e.g., running on the same computing device or on another computing device) of the method 500 inferring labels for another ego network. For example, the probability distributions of the focal user node here may be the "computed probability distributions" of a neighboring node for another focal user node in the other ego network. The sharing of the probability distributions may be partial. The probability distributions may be truncated to reduce the complexity of the system when inferring labels from a very large social graph.

Again at block 504, the inference system can receive updated probability distributions of the label types of one or more of the neighboring nodes (e.g., after one or more other process instances of the method 500 finishes an iteration of calculating the probability scores of the neighboring nodes). The inference system can also receive user-reported updates of the label types of the neighboring nodes. Upon receiving the updated probability distributions or the user-reported updates, the inference system can re-compute the probability distributions of the possible attribute labels for the focal user node at block 506.

At block 510, the social networking system or the inference system can infer an attribute label based on the computed probability distributions for the focal user node. This enables the social networking system at block 512 to generate a user prompt based on the inferred attribute label for advertisement, friend suggestion, label suggestion, or affiliation suggestion.

Figure 6:
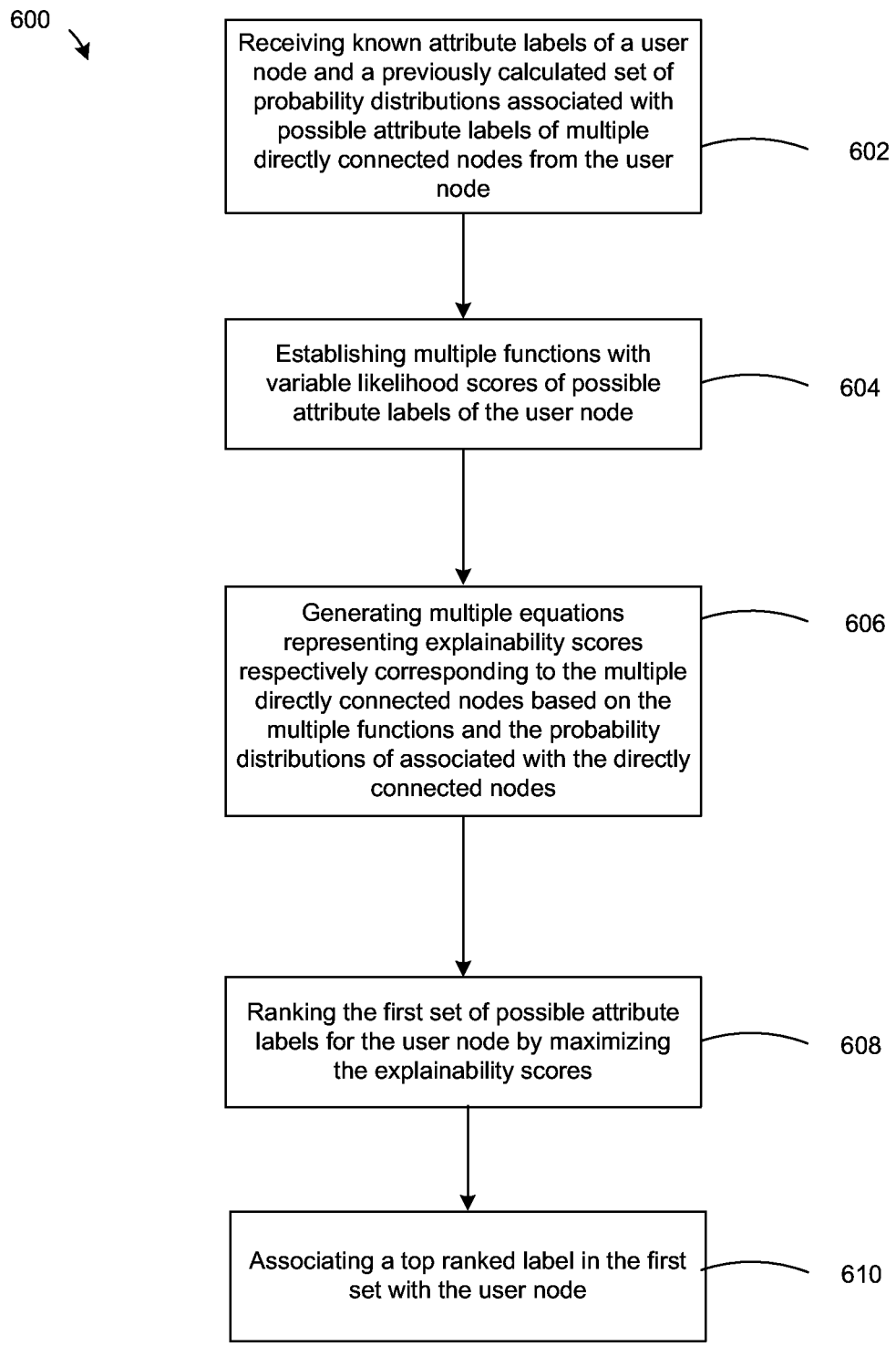
FIG. 6 is a flow chart of a method of operating a computing system to infer user node attributes and social connection explanations, in accordance with various embodiments.

FIG. 6 is a flow chart of a method 600 of operating a computing system to infer user node attributes and social connection explanations, in accordance with various embodiments. The method 600 can be performed by an inference system, e.g., the inference system 202 of FIG. 2 or the inference system 322 of FIG. 3. The method 600 may be implemented by one or more computing devices (e.g., the computing device 800 of FIG. 8).

The method 600 begins at block 602 by receiving known (e.g., expressly specified) attribute labels of a user node and receiving a previously computed set of probability distributions associated with possible attribute labels of multiple directly connected nodes from the user node from a social graph in a social networking system (the social networking system 200 of FIG. 2 or the social networking system 302 of FIG. 3). The previously computed set may be consistent with existing attribute labels (e.g., user-specified attribute labels) of the multiple directly connected nodes. For example, the previously computed set may be initialized by another process of the inference system.

At block 604, the inference system establishes multiple functions with variable likelihood scores of possible attribute labels of the user node and the previously computed set of the probability distributions as parameters. The multiple functions may correspond to Eq. 2. The multiple functions correspond to multinomial distributions for the user node. Each multinomial distribution denotes probabilities over all possible attribute labels for a label type ("t") of the user node. The multinomial distributions are established to be consistent with the known attribute labels of the user node. For example, establishing each function corresponding to each multinomial distribution can include establishing a summation of products of $f_{utl}$ and $f_{vtl}$ over all possible attribute labels of the label type t. "$f_{utl}$" represents a variable probability that the user node has an attribute label ("l") of the label type t and $f_{vtl}$ representing a probability that the directly connected node v has the same attribute label l of the label type t.

$f_{utl}$ is set to be 1 when the known attribute labels of the user node includes the attribute label l of the label type t and to be 0 when the known attribute labels of the user node includes another attribute label of the label type t such that the other attribute label is mutual exclusive to the attribute label l. $f_{vtl}$ is set in accordance with the previously computed set of the probability distributions for the directly connected node v. $f_{vtl}$ may be initially set to be a nominal value between 0 and 1 when a probability distribution for the label type t is absent from the previously computed set and no attribute label of the label type t is known in the social networking system for the directly connected node v At block 606, the inference system generates multiple equations representing explainability scores respectively corresponding to the multiple directly connected nodes based on the multiple functions and the probability distributions associated with the multiple directly connected nodes. The multiple equations may correspond to Eq. 3. Each explainability score measures a likelihood that a direct social connection between a directly connected node ("v") and the user node is explained by at least a shared attribute label between the user node and the directly connected node. In some embodiments, generation of each equation corresponding to the explainability score of the directly connected node v may be based on taking a softmax operation on the multiple functions associated with the directly connected node v. The multiple functions are arguments to the softmax operation. For example, the softmax operation may be configured as a sigmoid function with a cumulative maximum of the arguments as the sigmoid function's argument.

At block 608, the inference system ranks a first set of possible attribute labels for the user node by maximizing the explainability scores utilizing the multiple equations respectively associated with the multiple directly connected nodes. For example, maximizing the explainability scores can include varying the variable likelihood scores of the user node to maximize the explainability scores. Maximizing the explainability scores includes identifying a cumulative maximum (e.g., via summation or cumulative product) of the explainability scores. Ranking the first set can include calculating a probability score for each of the possible attribute labels in the first set. The logic of blocks 604, 606, and 608 may be performed simultaneously by the computing system, e.g., by utilizing Eq. 4 to solve Eq. 1, Eq. 2, and Eq. 3 simultaneously. At block 610, the inference system can associate a top ranked label in the first set of the possible attribute labels with the user node in the social networking system.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 7:
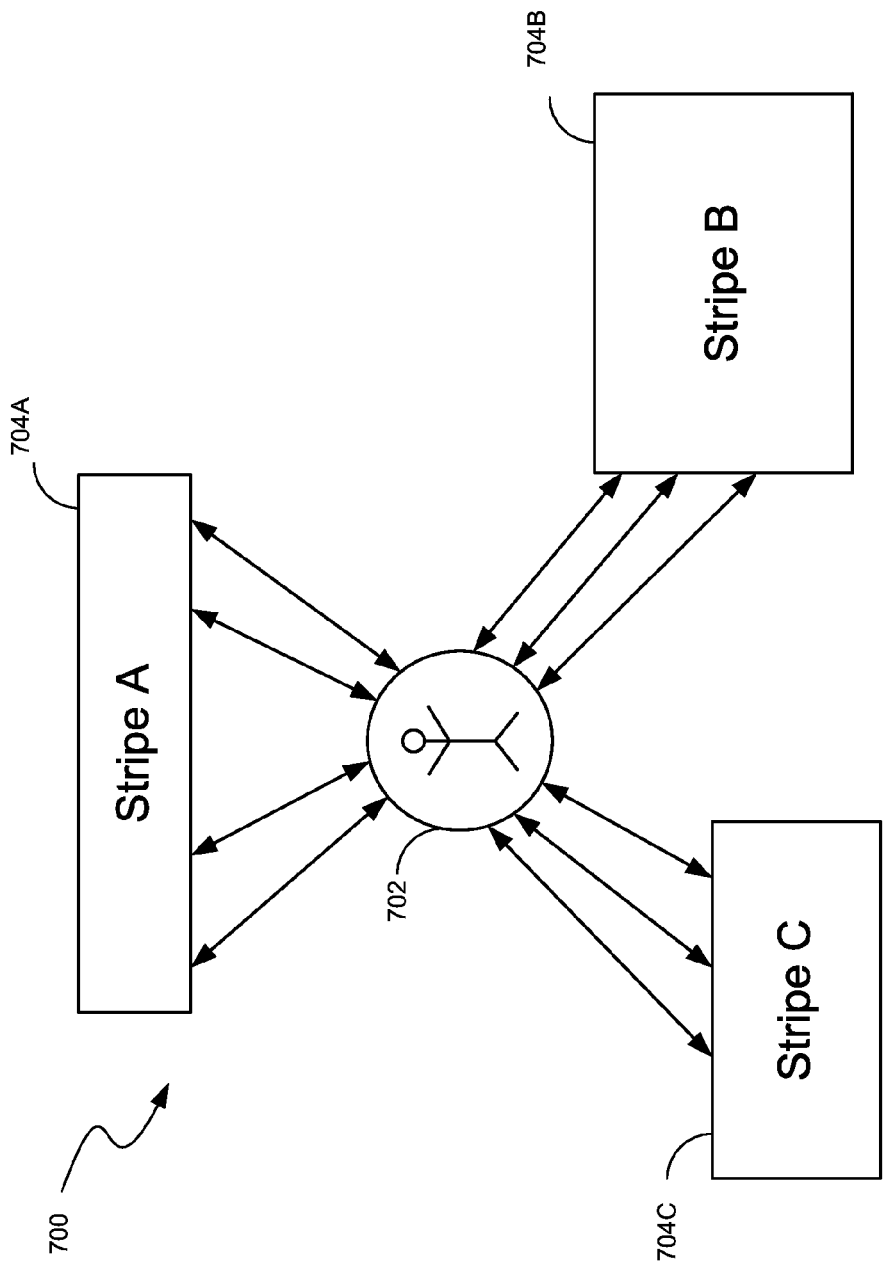
FIG. 7 is a schematic diagram illustrating an ego network within a social graph of a social networking system where social connections from a focal user node are striped when iteratively inferring attribute labels for the focal user node, in accordance with various embodiments.

FIG. 7 is a diagram illustrating an ego network 700 within a social graph of a social networking system (e.g., the social networking system 200 of FIG. 2 or the social networking system 302 of FIG. 3), where social connections from a focal user node 702 are striped (e.g., segmented into groups) when iteratively inferring attribute labels for the focal user node 702, in accordance with various embodiments. An inference system, e.g., the inference system 202 of FIG. 2 or the inference system 322 of FIG. 3, can iteratively infer social connection explanations corresponding to social graph edges in the ego network 700.

The inference system collects both social connection information and known or computed likelihood scores of attribute labels of neighboring nodes in the ego network 700 as its inputs. For example, the inputs may include the social connections (e.g., the social graph edges) in the ego network 700 and probability distributions of possible attribute labels (e.g., including known attribute labels) of neighboring nodes of the focal user node 702. However, when the ego network 700 is large, an inference process may take a long time to infer possible attribute labels for the focal user node 702.

The striping of the social connections advantageously reduces the complexity of the inference process. The inference process can iteratively process each social connection stripe (e.g., a social connection stripe 704A, a social connection stripe 704B, or a social connection stripe 704C, collectively as the "social connection stripes 704"). In various embodiments, the inference system assigns social connections into the social connection stripes 704 so as not to bias the inference system (e.g., by random selection). In some embodiments, the inference system processes the social connection stripes 704 in parallel. In other embodiments, the inference system processes the social connection stripes 704 in series.

Figure 8:
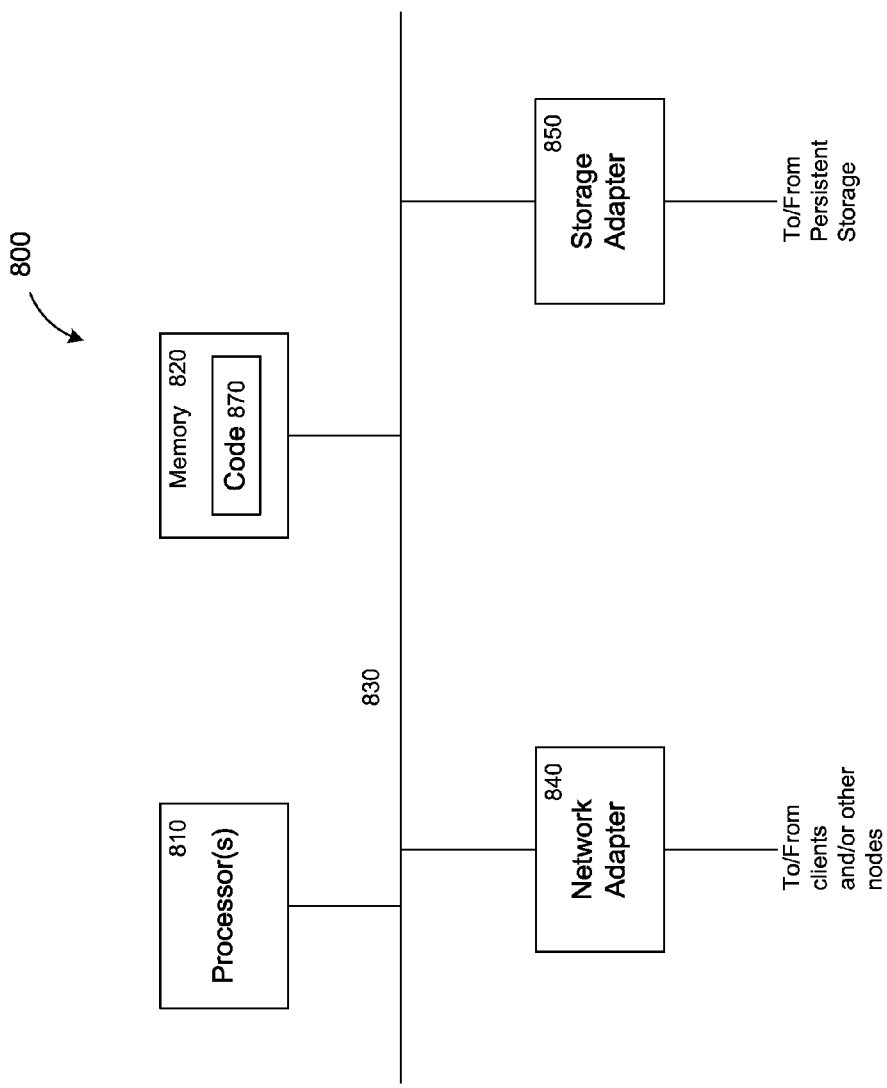
FIG. 8 is a block diagram of an example of a computing device, which may represent one or more computing device or server described herein, in accordance with various embodiments.

FIG. 8 is a block diagram of an example of a computing device 800, which may represent one or more computing device or server described herein. The computing device 800 includes one or more processors 810 and memory 820 coupled to an interconnect 830. The interconnect 830 shown in FIG. 8 is an abstraction that represents any one or more separate physical buses, point-to-point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computing device 800 and thus controls the overall operation of the computing device 800. In certain embodiments, the processor(s) 810 accomplishes this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computing device 800. The memory 820 represents any form of random access memory (RAM), read-only memory (ROM), flash memory, or the like, or a combination of such devices. In use, the memory 820 may contain a code 870 containing instructions according to the inference system disclosed herein.

Also connected to the processor(s) 810 through the interconnect 830 are a network adapter 840 and a storage adapter 850. The network adapter 840 provides the computing device 800 with the ability to communicate with remote devices, over a network and may be, for example, an Ethernet adapter or Fibre Channel adapter. The network adapter 840 may also provide the computing device 800 with the ability to communicate with other computers. The storage adapter 850 allows the computing device 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computing device 800 by downloading it from a remote system through the computing device 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification.

What is claimed is:

1. A computer-implemented method, comprising:
    receiving one or more user-specified attribute labels of a user node and a set of probability distributions associated with possible attribute labels of nodes directly connected from the user node from a social graph in a social networking system;
    establishing multiple functions with variable likelihood scores of possible attribute labels of the user node and the set of the probability distributions as parameters;
    generating multiple equations representing explainability scores respectively corresponding to the nodes based on the multiple functions and the probability distributions associated with the nodes, each explainability score measuring a likelihood that a direct social connection between a directly connected node ("v") and the user node is explained by at least a shared attribute label between the user node and the directly connected node; and
    ranking a first set of the possible attribute labels for the user node by maximizing the explainability scores utilizing the multiple equations respectively associated with the nodes, the explainability scores being implicit predictions of formation reasons of social connections between each of the nodes and the user node.

2. The computer-implemented method of claim 1, wherein ranking the first set includes calculating a probability score for each of the possible attribute labels in the first set; and wherein maximizing the explainability scores includes varying the variable likelihood scores of the user node to maximize the explainability scores, and each variable likelihood score corresponds to the probability score for each of the possible attribute labels.

3. The computer-implemented method of claim 1, wherein the multiple functions correspond to multinomial distributions for the user node, each multinomial distribution denoting probabilities over a type-specific subset of the possible attribute labels for a label type ("t") of the user node, wherein the multinomial distributions are established to be consistent with the user-specified attribute labels of the user node.

4. The computer-implemented method of claim 3, wherein establishing each function corresponding to each multinomial distribution includes establishing a summation of products of $f_{utl}$ and $f_{vtl}$ over the type-specific subset of the possible attribute labels of the label type t, $f_{utl}$ representing a variable probability that the user node has an attribute label ("l") of the label type t and $f_{vtl}$ representing a probability that the directly connected node v has the same attribute label l of the label type t.

5. The computer-implemented method of claim 4, wherein $f_{utl}$ is set to be 1 when the user-specified attribute labels of the user node includes the attribute label l of the label type t and to be 0 when the user-specified attribute labels of the user node includes another attribute label of the label type t such that the other attribute label is mutual exclusive to the attribute label l.

6. The computer-implemented method of claim 4, wherein $f_{vtl}$ is set in accordance with the set of the probability distributions for the directly connected node v.

7. The computer-implemented method of claim 6, wherein $f_{vtl}$ is initially set to be a nominal value between 0 and 1 when a probability distribution for the label type t is absent from the set and no attribute label of the label type t is known in the social networking system for the directly connected node v.

8. The computer-implemented method of claim 4, wherein generating each equation corresponding to the explainability score of the directly connected node v is based on taking a softmax operation on the multiple functions corresponding to the multinomial distributions associated with the directly connected node v, the multiple functions being arguments to the softmax operation.

9. The computer-implemented method of claim 8, wherein the softmax operation is monotonically non-decreasing for each argument.

10. The computer-implemented method of claim 8, wherein the softmax operation returns a value close to a maximum value of the softmax operation whenever at least one of the arguments is close to the maximum value.

11. The computer-implemented method of claim 8, wherein the softmax operation is a function that is differentiable.

12. The computer-implemented method of claim 8, wherein the softmax operation is implemented as a sigmoid function that takes an input argument that is computed based a cumulative operation of the multinomial distributions.

13. The computer-implemented method of claim 8, wherein the softmax $$\operatorname*{softmax}_{t \in T}(r(u, v, t)) = \sigma\left(\alpha \sum_{t \in T} r(u, v, t) + c\right),$$

operation is implemented as the summation of r(u,v,t) representing the summation of the multiple functions, a and c being constant parameters.

14. The computer-implemented method of claim 1, wherein ranking the first set of the possible attribute labels includes identifying a cumulative maximum of the explainability scores.

15. The computer-implemented method of claim 1, further comprising associating a top ranked label in the first set of the possible attribute labels with the user node in the social networking system.

16. A computer system, comprising:
non-transitory memory configured to store executable instructions;
one or more processors configured by the executable instructions to:
receive one or more user-specified attribute labels of a user node and a set of probability distributions associated with possible attribute labels of nodes directly connected from the user node from a social graph in a social networking system;
establish multiple functions with variable likelihood scores of possible attribute labels of the user node and the set of the probability distributions as parameters;
generate multiple equations representing explainability scores respectively corresponding to the nodes based on the multiple functions and the probability distributions associated with the nodes, each explainability score measuring a likelihood that a direct social connection between a directly connected node ("v") and the user node is explained by at least a shared attribute label between the user node and the directly connected node; and
rank a first set of the possible attribute labels for the user node by maximizing the explainability scores utilizing the multiple equations respectively associated with the nodes, the explainability scores being implicit predictions of formation reasons of social connections between each of the nodes and the user node.

17. A non-transitory computer readable medium storing computer-executable instructions that, when executed by a computer system, cause the computer system to perform a computer-implemented method, the computer-executable instructions comprising:
instructions for receiving one or more user-specified attribute labels of a user node and a set of probability distributions associated with possible attribute labels of nodes directly connected from the user node from a social graph in a social networking system;
instructions for establishing multiple functions with variable likelihood scores of possible attribute labels of the user node and the set of the probability distributions as parameters;
instructions for generating multiple equations representing explainability scores respectively corresponding to the nodes based on the multiple functions and the probability distributions associated with the nodes, each explainability score measuring a likelihood that a direct social connection between a directly connected node ("v") and the user node is explained by at least a shared attribute label between the user node and the directly connected node; and
instructions for ranking a first set of the possible attribute labels for the user node by maximizing the explainability scores utilizing the multiple equations respectively associated with the nodes, the explainability scores being implicit predictions of formation reasons of social connections between each of the nodes and the user node.

18. The computer readable data storage memory of claim 17, wherein the computer-executable instructions further comprises instructions for associating a top ranked label in the first set of the possible attribute labels with the user node in the social networking system.

19. The computer readable data storage memory of claim 17, wherein the multiple functions correspond to multinomial distributions for the user node, each multinomial distribution denoting probabilities over a type-specific subset of the possible attribute labels for a label type ("t") of the user node, wherein the multinomial distributions are established to be consistent with the user-specified attribute labels of the user node.

20. The computer readable data storage memory of claim 17, wherein the computer-executable instructions further comprises:
instructions for calculating a probability score for each of the possible attribute labels in the first set; and
instructions for varying the variable likelihood scores of the user node to maximize the explainability scores, and wherein each variable likelihood score corresponds to the probability score for each of the possible attribute labels.

* * * * *